US007814122B2

(12) United States Patent
Friedrich et al.

(10) Patent No.: US 7,814,122 B2
(45) Date of Patent: Oct. 12, 2010

(54) SYSTEM AND METHOD FOR DOCUMENTATION PROCESSING WITH MULTI-LAYERED STRUCTURING OF INFORMATION

(75) Inventors: Wolfgang Friedrich, Bubenreuth (DE); Wolfgang Wohlgemuth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 533 days.

(21) Appl. No.: 09/963,010

(22) Filed: Sep. 25, 2001

(65) Prior Publication Data

US 2002/0049775 A1 Apr. 25, 2002

Related U.S. Application Data

(63) Continuation of application No. PCT/DE00/00782, filed on Mar. 13, 2000.

(30) Foreign Application Priority Data

Mar. 25, 1999 (DE) ............................... 199 13 678

(51) Int. Cl.
*G06F 17/00* (2006.01)
(52) U.S. Cl. ...................... 707/796; 707/800
(58) Field of Classification Search ................. 382/118, 382/100, 154; 707/3, 104.1, 100, 796, 800; 348/207.99; 359/618; 434/19
See application file for complete search history.

(56) References Cited

U.S. PATENT DOCUMENTS

| 5,537,526 | A | 7/1996 | Anderson et al. ........... 395/148 |
| 5,712,649 | A | 1/1998 | Tosaki ............................. 345/8 |
| 5,754,766 | A | 5/1998 | Shaw et al. ............... 395/200.3 |
| 5,812,394 | A | 9/1998 | Lewis et al. .................. 364/146 |
| 5,850,352 | A | 12/1998 | Moezzi et al. ........... 364/514 A |
| 6,046,712 | A * | 4/2000 | Beller et al. ............ 348/207.99 |
| 6,091,546 | A * | 7/2000 | Spitzer ........................ 359/618 |
| 6,349,001 | B1 * | 2/2002 | Spitzer ........................ 359/618 |
| 6,430,306 | B2 * | 8/2002 | Slocum et al. .............. 382/118 |
| 6,739,873 | B1 * | 5/2004 | Rod et al. ...................... 434/19 |

FOREIGN PATENT DOCUMENTS

| EP | 0597127 | 5/1994 |
| EP | 0708392 | 4/1996 |
| GB | 2327289 | 1/1999 |

OTHER PUBLICATIONS

Derday et al., "Das Patentinformationssystem PATIS im Deutschen Patentamt", Nov. 1993.

* cited by examiner

*Primary Examiner*—Sana Al-Hashemi
(74) *Attorney, Agent, or Firm*—King & Spalding L.L.P.

(57) ABSTRACT

The invention relates to a system and a method for documentation processing, in particular for technical and industrial applications, with storage means (1) for storing documentation data (I1 . . . In) on several levels (E1 . . . Em) and with acquisition means (2) for acquiring real information (R), with access means for accessing the documentation data (I1 . . . In) and with evaluation means (A) for evaluating the real information (R) and for selecting the stored documentation data in dependence on the real information (R). As a result, for example for service applications in situ, i.e. for example the location of an automation system, structured and selective access to the documentation data is made possible by the integration of the documentation data (I1 . . . In) as augmented reality.

9 Claims, 3 Drawing Sheets

SYSTEM AND METHOD FOR DOCUMENTATION PROCESSING WITH MULTI-LAYERED STRUCTURING OF INFORMATION

This a continuation of application Serial No. PCT/DE00/00782 filed Mar. 13, 2000, PCT Publication WO 00/58799, which claims the priority of DE 199 13 678.5, filed Mar. 25, 1999.

FIELD OF THE INVENTION

The invention relates to a system and a method for documentation processing, in particular for technical and industrial applications.

BACKGROUND OF THE INVENTION

A system and method for documentation processing have been used in connection with what are known as augmented-reality (AR) techniques. This involves an application-oriented requirements analysis and development of AR-based systems for supporting work processes in the development, production and servicing of complex technical products, and installations in production and process engineering, and also for service support systems, as in the case of motor vehicles or for the maintenance of any technical equipment.

GB 2 327 289 discloses an apparatus which visually presents instructions on work to be carried out and information on results of this work simultaneously to an assembly line worker by means of a display. The results of the work are acquired by measuring means or by the input of a specific part number by the worker, and the work process is recorded by cameras.

SUMMARY OF THE INVENTION

The present invention has as its object, specifying a system and a method which make possible, situation-relevant rapid access to stored documentation data. This object is achieved by a method for documentation processing, in particular for technical and industrial applications, in which documentation data are stored on several levels and real information is acquired by acquisition means, in which the documentation data are accessed in such a way that the real information is evaluated and the stored documentation data are selected depending on the real information.

The documentation data may be data prepared and gathered during the setting up of an installation or an automation system, and/or documentation data kept and progressively updated during the operation of an installation or an automation system on the basis of predeterminable criteria. These documentation data may be stored on storage means, which are stored both locally, i.e. at the location of the respective application, or else at any other location, for example at the location of the respective manufacturing companies of individual installation components. With the aid of an acquisition means the real information is acquired from an image content, and evaluated by using an evaluation means, so that an assignment of the real objects to the object data stored in the documentation data becomes possible. On the basis of the real information data, for example in the form of a detected object, the additional object data contained in the documentation data are then selected, in particular automatically, and made available in situ, for example for service purposes. As a result, situation-relevant rapid access to the respectively required data is made possible.

Component-oriented support by the stored documentation data can be ensured by the documentation data being stored on an object-oriented basis. As a real object, for example, a tank of an installation is detected and identified, with the documentation data assigned to this "tank", for example year of construction, capacity, etc., being visually presented.

Rapid situation-relevant access to the documentation data is further supported by the acquisition means having an image-capturing device; by the evaluation means for the evaluation of the real information being provided in such a way that a context of use, in particular an object of the documentation data, is determined from the real information; and in that the system has visualizing means for visually presenting the documentation data. User-controlled access to the documentation data can be achieved by the acquisition means being user-controlled and designed in particular as voice-controlled acquisition means and/or acquisition means controlled by control data. Use of augmented-reality techniques in an optimum way for many applications, on the basis of the stored documentation data, may take place by the acquisition means and/or the visualizing means being designed as head-mounted displays.

BRIEF DESCRIPTION OF THE DRAWINGS

The present invention is described in greater detail below in conjunction with the exemplary embodiments represented in the Figures, in which.

DETAILED DESCRIPTION OF THE INVENTION

Figure 1:
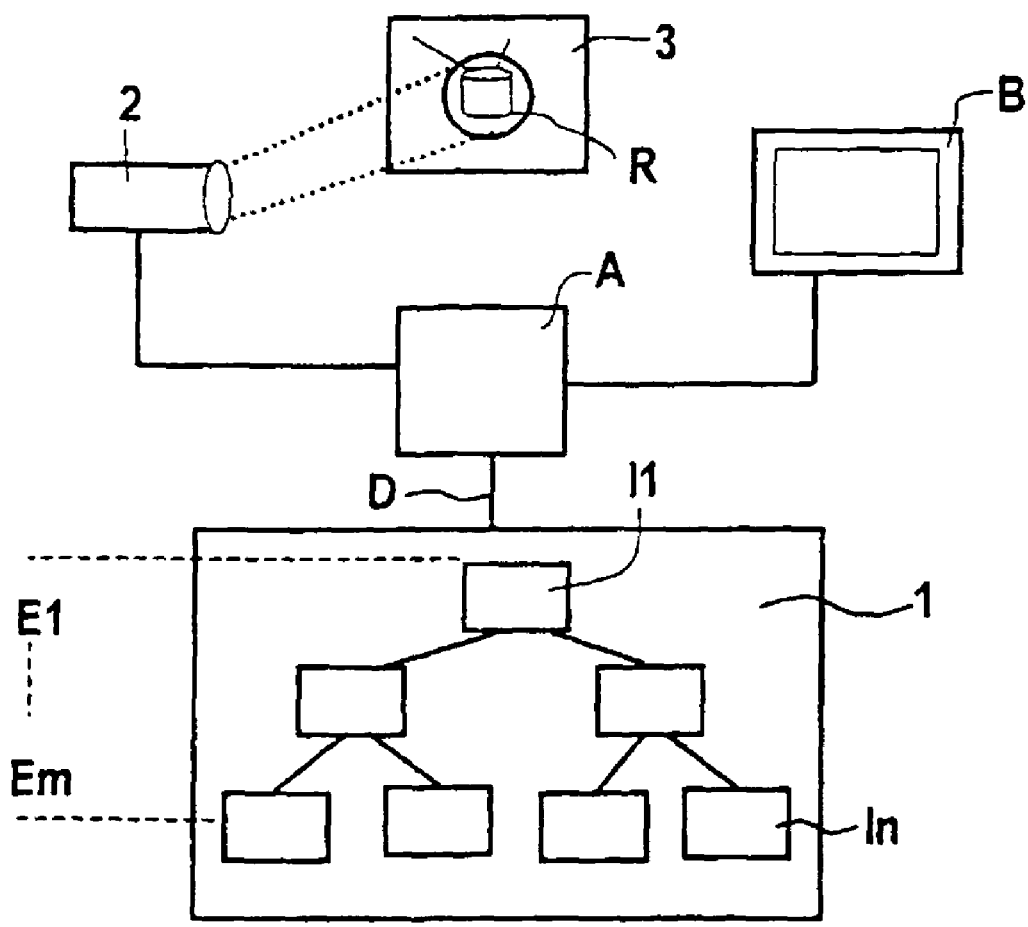
FIG. 1 shows a block diagram of an exemplary embodiment of a system for documentation processing.

FIG. 1 shows a block diagram of a system for structured documentation processing with the assistance of augmented-reality techniques. The system comprises storage means 1 for storing documentation data I1 ... In. The documentation data I1 ... In are stored on several levels E1 ... Em. The storage means 1 is able to be coupled to evaluation means A via a data connection D, with the evaluation means A being able to be coupled to acquisition means 2 and visualizing means. In FIG. 1, the acquisition means 2 is represented as a camera and the visualizing means B is represented as a screen. In other embodiments, the acquisition means 2 and the visualizing means B may, however, also be a head-mounted display with integrated video camera. The acquisition means 2 serve for acquiring real information R, for example, individual components of an industrial installation and/or an automation system.

Figure 2:
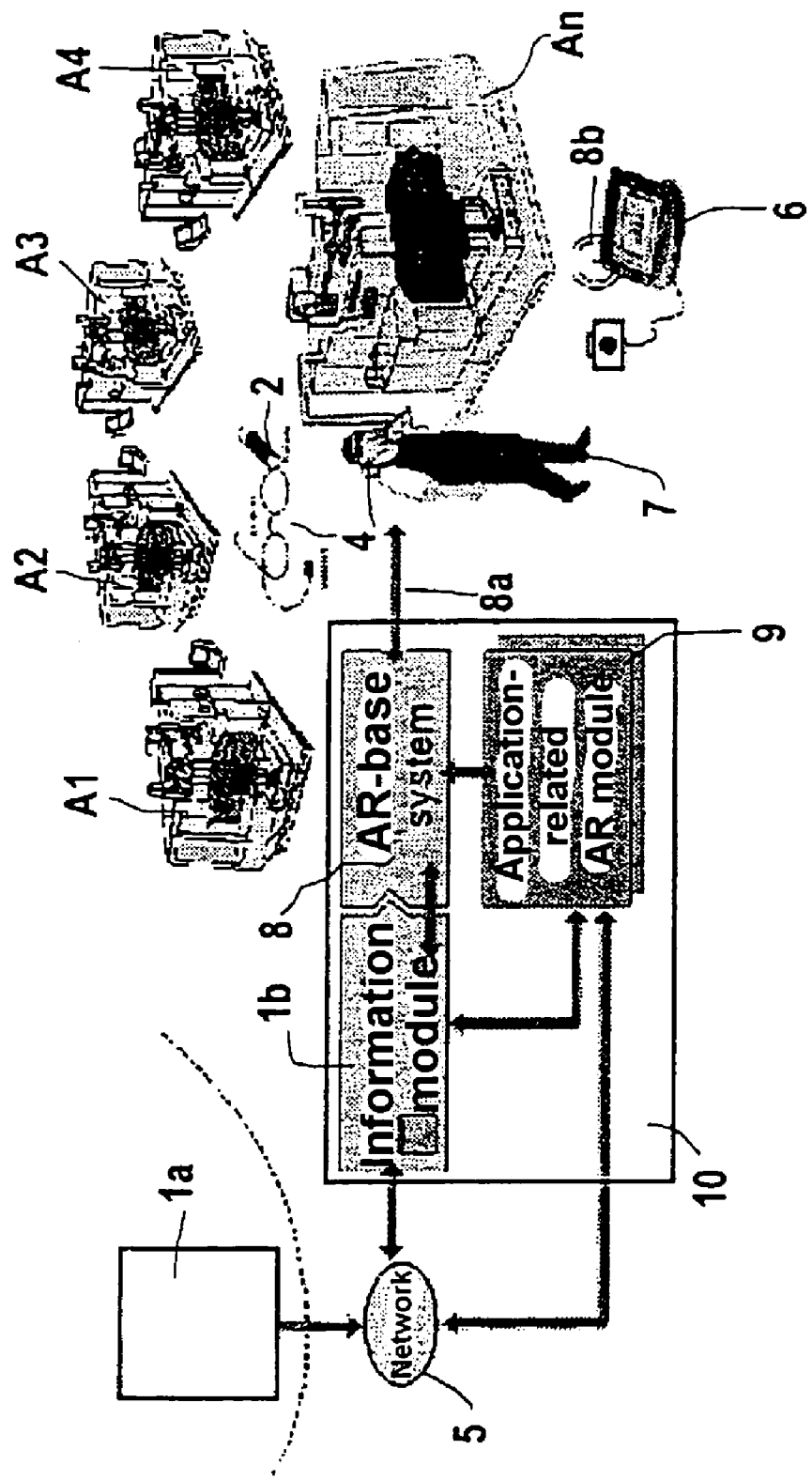
FIG. 2 shows an example of use of a system for documentation processing for service and maintenance.

FIG. 1 forms the basic structure of a system for documentation processing using augmented-reality techniques with documentation data I1 ... In stored on various levels. One application scenario for this system is as follows: with the aid of the acquisition means 2, real information is acquired in the form of image information, for example an installation is captured. This real information R is evaluated with the aid of the evaluation means A to detect individual objects, such as individual components of an automation system. This may be in the form of additional information attached to the real objects, for example by barcode stickers, or by comparison of the image information with comparison data stored in the evaluation means A and/or the documentation data 1. After determining a desired object which corresponds to the real information R, the documentation data stored on several levels E1 . . . Em is called up automatically (and/or under user control) and displayed via the visualizing means B to the user 7 as shown in FIG. 2. This documentation data I1 . . . In forms additional information, which supports the user 7, for example during repair, maintenance etc. He is provided with situation-relevant rapid access to the respectively required data. The documentation data I1 . . . In may in this case either be stored in situ, for example on a data processing device, or else at remote locations, in which case access to the information data I1 . . . In is possible via an Internet link.

FIG. 2 illustrates the use of a system for documentation processing for service and maintenance. The system comprises an augmented-reality system 10, which is also referred to hereafter as AR system for short. The AR system contains an information module 1b, for storing information data, an AR base system 8 and an AR application module. The AR system is able to be connected to further storage means 1a via a network link 5, for example an Internet connection. The communication between a user 7 and the AR system 10 takes place via interfaces 8a, 8b. For this purpose, the AR system has a transceiving device, which makes bidirectional data communication possible between the AR system and the user 7 via a head-mounted display 4, either directly via the interface 8a, or via a radio transceiving device 6 arranged in the region of the user 7 and having an interface 8b with respect to the user 7. The user 7 is, for example, a service engineer who is being employed for maintaining installations A1 . . . An. With the aid of the head-mounted display 4, it is possible for the user 7 to move freely in the installations A1 . . . An.

The mode of operation of the system represented in FIG. 3 corresponds essentially to the modes of operation already explained in connection with FIG. 1. The user 7 is viewing for example a single installation component. With the aid of the camera serving as an acquisition means and arranged on the head-mounted display 4, the real information is transmitted to the AR system 10. An evaluation of the real information and access to the documentation data stored in the first storage means 1a or the second storage means 1b takes place there. The documentation data are visually presented to the user 7 via a visualizing device arranged in the head-mounted display 4 and made available on an object-oriented and situation-relevant basis.

Figure 3:
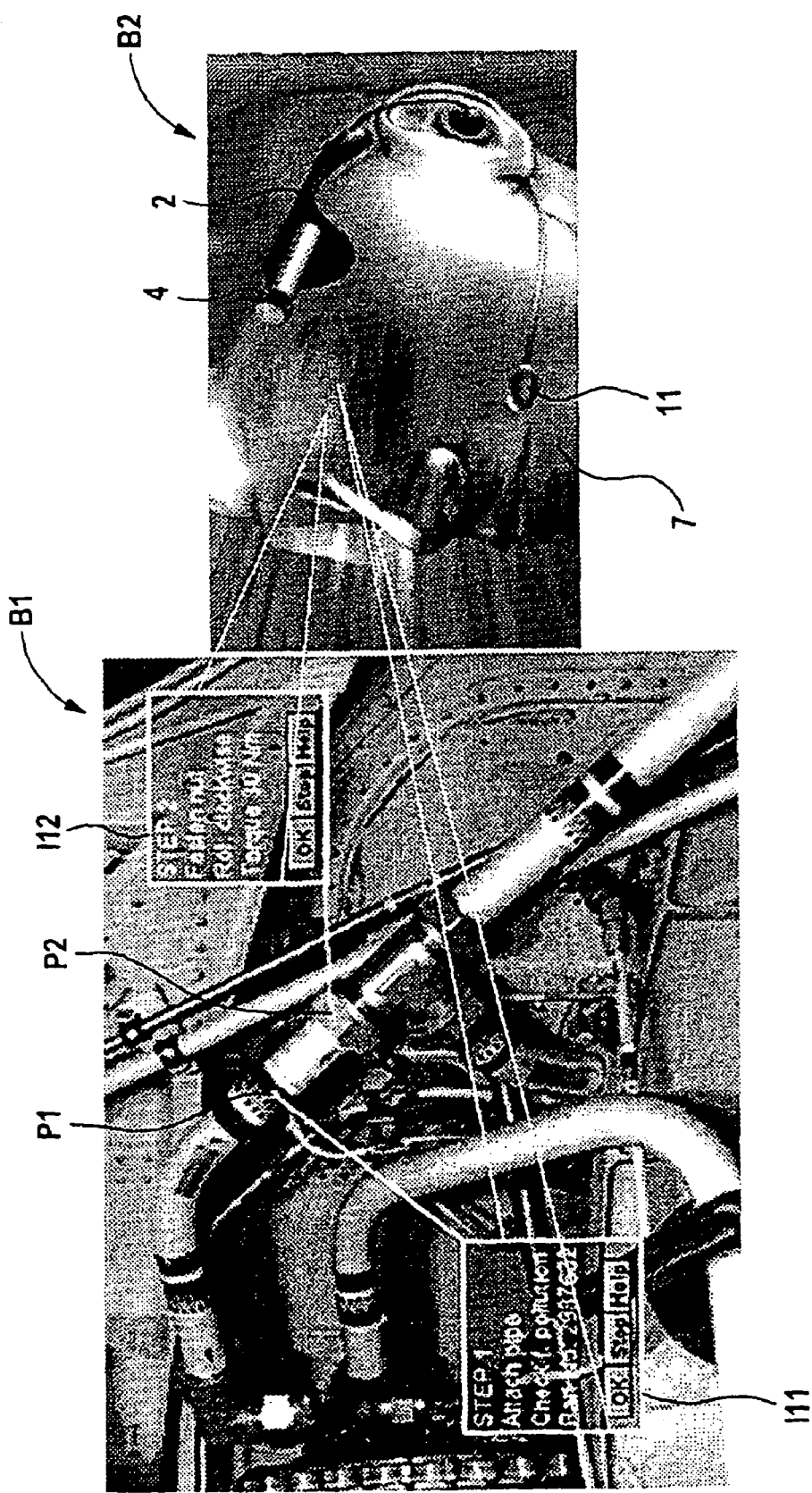
FIG. 3 shows an example of use for situation-relevant access to documentation data.

FIG. 3 shows an example of use for situation-relevant access to documentation data. For this purpose, a view of pipelines which can be viewed with a head-mounted display 4, represented in an image window B2, is represented in a left-hand image detail B1. Arranged on the head-mounted display 4 are acquisition means 2, for example in the form of a video camera. Marked in the left-hand image B1 are two points P1, P2, which respectively represent image details viewed with the aid of the head-mounted display 4. When viewing the first point P1, i.e. when viewing the pipeline arranged in the region of the point P1, additional information is visually presented to the user 7 in the head-mounted display 4. This additional information I11, I12 comprises documentation data which contain work instructions with respect to the first point P1 with respect to this piece of pipe and comprise an installation instruction with respect to the point P2, to be carried out in a second step. The installation instruction in this case comprises informing the user 7 of the torque and direction of rotation of the screwed joint of the point P2 via the visual presentation E12. Also arranged on the head-mounted display 4 is a microphone 11, by which the user can support a specific selection of the documentation data under voice control.

The text below provides background information on the field of use of the invention: this involves an application-oriented requirements analysis and development of AR-based systems for supporting work processes in the development, production and servicing of complex technical products and installations in production and process engineering, and also for service support systems, as in the case of motor vehicles or for the maintenance of any technical equipment.

Augmented reality, AR for short, is a new type of man-machine interaction with great potential for supporting industrial work processes. With this technology, the viewer's field of view is enhanced by computer-generated virtual objects, which means that product or process information can be used intuitively. Besides the very simple interaction, the use of portable computers opens up AR application fields with high mobility requirements, for example if process, measurement or simulation data are linked to the real object.

The situation in the German industry is characterized by increasing customer requirements in terms of individuality and quality of products and by the development processes taking significantly less time. In particular in the development, production and servicing of complex technical products and installations, innovative solutions for man-machine interaction allow great advances in efficiency and productivity to be achieved and work to be organized in a way promoting competence and learning, by the users' need for knowledge and information being supported in a situation-relevant manner on the basis of data available in any case.

Augmented reality is a technology with numerous innovative fields of application:

In development for example, a "mixed mock-up" approach based on a mixed-virtual environment can significantly speed up the early development phases. In comparison with immersive "virtual reality" (VR) solutions, the user is at a substantial advantage in that the haptic properties can be faithfully depicted with the aid of a real model, whereas aspects of visual perception, e.g. for display variants, can be manipulated in a virtual manner. In addition, there is great potential for the user-oriented validation of computer-aided models, e.g. for component verification or in crash tests.

In flexible production, it is possible, inter alia, for the setting up of machines to be made much easier for qualified skilled workers by using, for example, mobile AR components to depict mixed-virtual clamping situations directly in the field of view. Production planning and production control appropriate for the skilled worker in the workshop is made easier if information on the respective order status is perceived directly in situ in connection with the corresponding products. The same also applies to assembly, with the option of presenting the individual work steps to the assembler in a mixed-virtual manner already in the training phase. In this connection, it is possible, for example by comparing real assembly procedures with results of simulations, to achieve extensive optimizations which both improve the quality of work scheduling and simplify and speed up the assembly process in the critical start-up phase.

Finally, regarding servicing, conventional technologies are by now barely adequate for supporting and documenting the complex diagnostic and repair procedures. Since, however, these processes in many fields are in any case planned on the basis of digital data, AR technologies provide the possibility of adopting the information sources for maintenance purposes and of explaining the dismantling process to an engineer, for example in the head-mounted display, by overlaying real objects.

Regarding cooperative work, the AR-assisted "remote eye" permits a distributed problem solution by virtue of a remote expert communicating across global distances with the member of staff in situ. This case is particularly relevant for the predominantly medium-sized machine tool manufacturers. Because of globalization, they are forced to set up production sites for their customers worldwide. However, neither can the presence of subsidiaries in all the important markets be achieved on economic grounds nor is it possible to dispense with the profound knowledge of experienced service staff of the parent company with respect to the increasingly more complex installations.

The special feature of man-machine interaction in augmented reality is the very simple and intuitive communication with the computer, supplemented for example by multimode interaction techniques such as voice processing or gesture recognition. The use of portable computer units additionally makes possible entirely new mobile utilization scenarios, with the option of requesting the specific date at any time via a wireless network. New visualizing techniques allow direct annotation, for example of measurement or simulation data, to the real object or into the real environment. In conjunction with distributed applications, a number of users are able to operate in a real environment with the aid of a shared database (shared augmented environments) or to cooperate in different environments with AR support.

Augmented reality has been the subject of intense research only in the last few years. Consequently, only a few applications exist, either at the national or international level, usually in the form of scientific prototypes in research establishments.

USA: As with many new technologies, the potential uses of augmented reality were first exploited in North America. Examples include cockpit design or the maintenance of mechatronic equipment. The aircraft manufacturer Boeing has already carried out initial field trials using AR technology in the assembly field. The result is that, in this high-tech area too, the USA occupy a key position, potentially making them technological leaders.

Japan: Various AR developments are being pushed in Japan, for example for mixed-virtual building design, telepresence or "cybershopping". The nucleus is formed by the Mixed Reality Systems Laboratory founded in 1997, which is supported jointly as a center of competence by science and by commerce and industry. Particular stimuli in the consumer goods field are likely in the future from the Japanese home electronics industry.

Europe: So far, only very few research groups have been active in Europe in the AR field. One group at the University of Vienna is working on approaches to mixed-real visualization. The IGD group, as part of the ACTS project CICC, which has now come to an end, has developed initial applications for the building industry and a scientific prototype for staff training in car manufacturing.

The [lacuna] in the invention should be seen in particular in the specific context of the fields of application "production machinery and machine tools" (NC-controlled, automation-technology processes) and "diagnostics/service support systems for complex technical component/equipment/systems" (for example vehicles, but also industrial machinery and installations).

Given the complexity and variety of equipment/systems/installations which have to be mastered by service staff/skilled workers (hereafter "personnel") in the phases of system set-up/commissioning through to maintenance, nowadays there is usually extensive documentation to provide support. This specifically comprises manuals, system and function descriptions, installation instructions etc. Depending on the application, there is a great variety of information; access to the descriptions relevant in actual working situations often involves considerable effort. Along with the series of problems involved in providing suitable support for information access, there is currently no adequate structuring of the documentation that specifically supports selective use by more intelligent systems, such as on the basis of AR technologies. Systems of this type require access to selected information details which are made available to the user in a way relevant for the situation. Even in electronically prepared documentation, paper still remains the main medium today as a basis for orientation.

The invention relates to the suitable structuring and provision of documentation for use by intelligent support systems in the sense mentioned above.

Today, documentation is already made available electronically. With suitable structuring of the documents and adequate access mechanisms (hyperlinks and so on), access using data-processing technology will improve further.

According to the invention, the information content of the documentation is divided into distinguishable units, the separation substantially helping to distinguish between data which are based on real information (i.e. observable information—e.g. object image) and data which represent additional information (e.g. object properties, object-based handling instructions, construction specifications, etc.).

Such a "multi-layered" structuring of the documentation has the effect of making the information contained selectively available.

The overall result is the provision of a system which supports data-technical structuring and use of documentation in the following sense:

The documentation is organized in several layers (or else on several "levels"); for example, one or more "static levels" can be imagined (diagrams, images, videos, . . . ) and in addition one or more "animation levels" (additional information) with differently detailed and classified information content.

There is consequently a separation of the information content with regard to "what can be seen in any case" (the given reality in the application case) and "what is additionally useful" (additional information/information details).

Access to the information is possible in an object-oriented manner, to have rapid access to the required data in a system-relevant manner.

An exemplary embodiment is used in the context of the use of AR-based technologies with automatic environment identification: the display of a pipeline system, for example the middle part in the fuselage of an aircraft, corresponds in this case to the given reality which the worker encounters in his employment environment. The situation is perceived/recorded by the support system, for example by a camera, and serves inter alia for determining the context of use ("which object is the worker viewing?"). The AR system derives from this the additional information, which is then taken in a situation-appropriate manner from the documentation in multi-layered form (i.e. assigned to the object observed). This additional information, for example the work steps to be carried out, is then superposed in the field of view for the user by the support system, in matching congruence with the real image.

A further exemplary embodiment is in the context of rather more conventional use of documentation: the user has himself identified the application situation and passed it on to the support system (for example by barcode identification or conventional data-processing-supported selection mechanisms). On the documentation base available in a multi-layered form, an image available in a static form or a video is then used according to the situation. The user's support system in turn automatically selects additional information from the multi-layered documentation, which originates from a further level assigned to the situation object. The presentation in the user's viewing field then takes place by superposing these information layers (images/videos and additional information).

In the case of FIG. 3, for example, a separation of information would take the following form:

real, observable information would in this case be the display of the pipelines in the background—documented either as a static image or as a video;

access to a separate layer of the documentation obtains the data of the handling instructions which can be superposed again separately from this, there is detailed information for carrying out the work procedure or technical data for the object handled ("pipeline to be assembled").

One field of use is the area of development, production and servicing based on see-through head-mounted displays in connection with portable computers, as an example scenario for augmented-reality-supported production or as augmented reality for service and maintenance.

In summary, the invention consequently relates to a system and method for documentation processing, in particular for technical and industrial applications, with storage means 1 for storing documentation data I1 . . . In on several levels E1 . . . Em and with acquisition means 2 for acquiring real information R, with access means for access to the documentation data I1 . . . In and with evaluation means A for evaluating the real information R and for selecting the stored documentation data in dependence on the real information R. As a result, for example for service applications in situ, i.e. for example the location of an automation system, structured and selective access to the documentation data is made possible by the integration of the documentation data I1 . . . In as augmented reality.

We claim:

1. A method for documentation processing comprising:
    storing documentation data on multiple levels,
    acquiring image information comprising images of individual physical components of an industrial installation by a camera, each acquired image comprising an image of the actual physical component rather than an image of a barcode or other representative identifier of the physical component,
    processing the image information by comparing said images of actual physical components with stored comparison data to generate specific data from said acquired image information,
    accessing the documentation data such that the stored documentation data are selected depending on the specific data.

2. The method according to claim 1, wherein image information is evaluated such that an object of the documentation data can be determined from the image information, and visually presenting the documentation data assigned to the determined object.

3. The method according to claim 1, further comprising acquiring the image information by an image-capturing device, determining a context of use from the image information, and visually presenting the determined documentation data.

4. The method according to claim 1, wherein the acquiring step is user-controlled.

5. The method according to claim 2 or 3, wherein the camera is arranged on a head-mounted display and the documentation data is visually presented via a visualizing device arranged in the head-mounted display.

6. The method according to claim 1, wherein the step of evaluating the image information comprises identifying specific objects or components within the image information.

7. The method according to claim 6, wherein the identified object or component comprises additional information.

8. The method according to claim 7, wherein the additional information is bar code information.

9. A computer-implemented method for documentation processing comprising:
    storing documentation data,
    acquiring an image of a system corresponding to a view from a user,
    processing the image to identify multiple different system components included in the image;
    automatically accessing the documentation data to identify relevant additional data corresponding to each of the multiple system components identified from the image; and
    visually presenting the relevant additional data identified for each of the multiple system components simultaneously.

* * * * *